United States Patent
Ehrle et al.

(10) Patent No.: US 11,045,971 B2
(45) Date of Patent: Jun. 29, 2021

(54) CUTTER HEAD AND CUTTER HEAD SYSTEM

(71) Applicant: OERTLI WERKZEUGE AG, Hori bei Bulach (CH)

(72) Inventors: Bruno Ehrle, Neuhausen (CH); Zoran Ostojic, Regensdorf (CH); Michael Paglione, Neunkirch (CH)

(73) Assignee: OERTLI WERKZEUGE AG

( * ) Notice: Subject to any disclaimer, the term of this patent is extended or adjusted under 35 U.S.C. 154(b) by 215 days.

(21) Appl. No.: 15/729,602

(22) Filed: Oct. 10, 2017

(65) Prior Publication Data
US 2018/0099430 A1 Apr. 12, 2018

(30) Foreign Application Priority Data
Oct. 10, 2016 (CH) ..................... 01351/16

(51) Int. Cl.
| | |
|---|---|
| *B27G 13/00* | (2006.01) |
| *B23C 5/20* | (2006.01) |
| *B23C 5/16* | (2006.01) |
| *B27G 13/10* | (2006.01) |
| *B27G 13/12* | (2006.01) |
| *B27G 13/04* | (2006.01) |
| *B23C 5/24* | (2006.01) |

(52) U.S. Cl.
CPC ............. *B27G 13/10* (2013.01); *B27G 13/04* (2013.01); *B27G 13/12* (2013.01); *B23C 5/2441* (2013.01)

(58) Field of Classification Search
CPC ... B23C 5/2441; B23C 5/2437; B23C 5/2472; B23C 5/2444; B27G 13/10; B27G 13/12; B27G 13/14; B27G 13/04
See application file for complete search history.

(56) References Cited

U.S. PATENT DOCUMENTS

| | | | | |
|---|---|---|---|---|
| 867,275 | A | * | 10/1907 | Hunter ................... B23C 5/2468 407/45 |
| 1,524,542 | A | * | 1/1925 | Divers .................... B27G 13/10 144/230 |

(Continued)

FOREIGN PATENT DOCUMENTS

| | | |
|---|---|---|
| DE | 3505974 | 10/1985 |
| DE | 3636618 | 5/1988 |

(Continued)

*Primary Examiner* — Sara Addisu
(74) *Attorney, Agent, or Firm* — Morriss O'Bryant Compagni Cannon, PLLC

(57) ABSTRACT

A cutter head for a woodworking machine, having a cylindrical, conical, or profiled base body which comprises at least two tool holders for holding a cutting insert. The tool holders each comprise a groove which is open in the radial direction, in which a cutting insert is clamped between a first groove wall of the groove and a one- or two-piece clamping element. The cutter head of can include a support plate arranged between the cutting insert and the first groove wall. The clamping screws are arranged at right angles to the axis and are thus accessible for a cutter change. The screw holder on the clamping element is a ball socket, and the front end of the screw is a round head. The cutter head of has a spring element, which positions the cutting insert during the clamping process, and presses the same via the functional surface radially outward against a stop.

21 Claims, 8 Drawing Sheets

(56) References Cited

U.S. PATENT DOCUMENTS

| | | | | |
|---|---|---|---|---|
| 1,707,903 A * | 4/1929 | Charlton | B23D 61/06 | 83/845 |
| 1,714,098 A * | 5/1929 | Miller | B23C 5/207 | 407/36 |
| 2,805,468 A * | 9/1957 | Williams | B23C 5/2455 | 407/41 |
| 2,814,320 A * | 11/1957 | Dukes | B27G 13/10 | 144/228 |
| 2,982,009 A * | 5/1961 | Swenson | B23C 5/2278 | 407/36 |
| 3,188,718 A * | 6/1965 | Wezel | B23C 5/2441 | 407/36 |
| 3,535,759 A * | 10/1970 | Mueller | B23C 5/2441 | 407/38 |
| 3,739,442 A * | 6/1973 | Lovendahl | B23C 5/207 | 407/113 |
| 4,329,091 A * | 5/1982 | Erkfritz | B23C 5/2441 | 407/108 |
| 4,449,556 A * | 5/1984 | Colton | B27G 13/10 | 144/230 |
| 4,614,463 A * | 9/1986 | Hughes | B23C 5/22 | 144/205 |
| 4,658,875 A * | 4/1987 | Grabovac | B27G 13/04 | 144/117.1 |
| 5,054,354 A * | 10/1991 | Kubis | B23D 47/005 | 83/698.41 |
| 5,163,490 A * | 11/1992 | Meis | B27G 13/04 | 144/117.1 |
| 5,558,142 A * | 9/1996 | Ehrle | B27G 13/10 | 144/218 |
| 5,658,101 A * | 8/1997 | Hammer | B02C 18/186 | 407/33 |
| 5,857,506 A * | 1/1999 | Paolone | B23C 5/2265 | 144/174 |
| 6,004,079 A * | 12/1999 | Kislinger | B27G 13/04 | 144/230 |
| 6,056,484 A * | 5/2000 | Mitchell | B23C 5/2493 | 407/36 |
| 6,119,741 A * | 9/2000 | Rowe | B27G 13/04 | 144/117.1 |
| 6,511,264 B2 * | 1/2003 | Ripley | B23C 5/2493 | 407/36 |
| 6,902,357 B2 * | 6/2005 | Blessing | B23B 51/0433 | 407/41 |
| 7,182,112 B2 * | 2/2007 | Meados | B27C 1/02 | 144/117.1 |
| 7,424,900 B2 * | 9/2008 | Soga | B23P 15/28 | 144/230 |
| 7,517,178 B2 * | 4/2009 | Martin | B27G 13/10 | 144/230 |
| 8,388,270 B2 * | 3/2013 | Waggle | B23C 5/08 | 144/235 |
| 2001/0017170 A1 * | 8/2001 | Thomas | B27G 13/04 | 144/230 |
| 2002/0046632 A1 * | 4/2002 | Wallin | B27G 13/10 | 82/1.11 |
| 2005/0265795 A1 * | 12/2005 | Misenheimer | B23C 5/08 | 407/49 |
| 2007/0201959 A1 * | 8/2007 | Priller | B23C 5/2273 | 407/67 |
| 2009/0000454 A1 * | 1/2009 | Baernthaler | B23B 27/045 | 83/843 |
| 2009/0245947 A1 * | 10/2009 | Turcot | B23C 5/08 | 407/33 |
| 2010/0319810 A1 * | 12/2010 | Patsch | B27G 13/10 | 144/235 |
| 2011/0182678 A1 * | 7/2011 | Waggle | B23C 5/08 | 407/49 |
| 2017/0028583 A1 * | 2/2017 | Eckert | B27G 13/04 | |
| 2017/0291322 A1 * | 10/2017 | Schlosser | B27G 13/10 | |

FOREIGN PATENT DOCUMENTS

| | | |
|---|---|---|
| DE | 8914809 | 12/1989 |
| DE | 10000330 | 7/2001 |
| WO | WO2015157871 | 10/2015 |

* cited by examiner

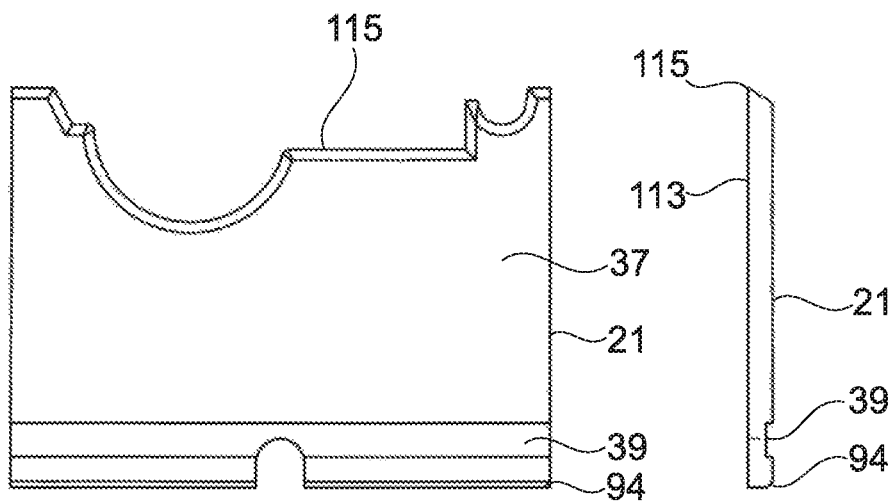
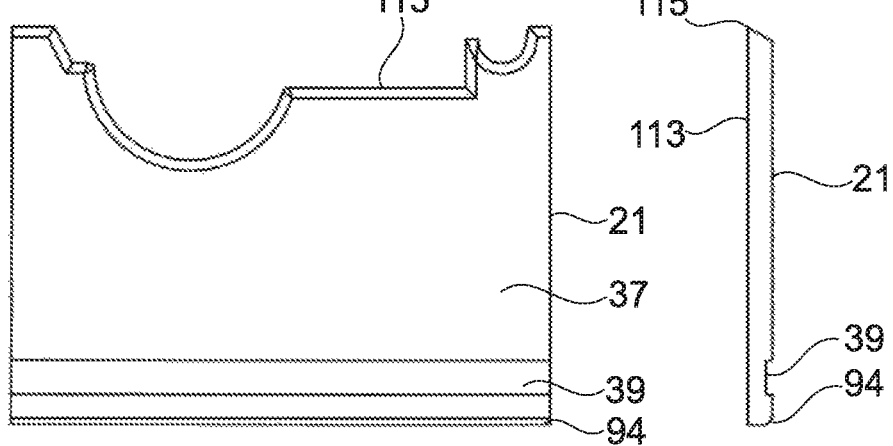
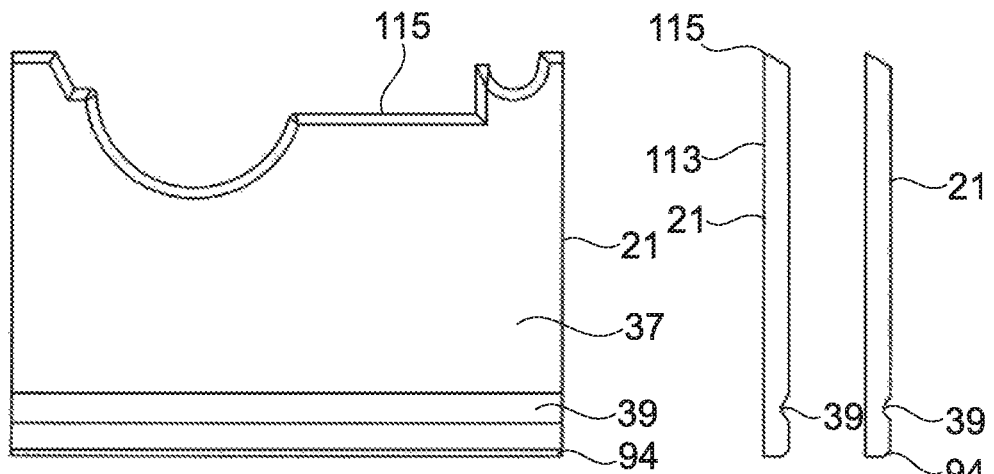

CUTTER HEAD AND CUTTER HEAD SYSTEM

CROSS-REFERENCE TO RELATED APPLICATION

This application claims priority to Swiss Patent Application No. 01351/16 filed Oct. 10, 2016, the entirety of which is incorporated by this reference.

FIELD OF THE INVENTION

The invention relates to a cutter head, particularly for a woodworking machine, and to a cutter head system comprising a cutter head, particularly for a woodworking machine.

PRIOR ART

DE 36 36 618 discloses a cutter shaft for chip-removing woodworking machinery, particularly for planers. It has an integral shaft body with a plurality of paraxial grooves which narrow as they approach the circumferential surface. In each of these sits a profiled, disposable cutter which is pretensioned by a centrifugal wedge, and which engages positively into a corresponding profiling of the lateral surface of a retaining ledge situated between the disposable cutter and the centrifugal wedge. In this case, the retaining ledge is immovably connected to the shaft body and can be elastically deformed. It is arranged at a certain distance from the groove wall of the groove, such that when the circumferential wedge is detached, a cutter between the same can be easily pulled out in the longitudinal direction, and a new cutter can be inserted essentially with no play. If the centrifugal wedge generates the clamping force by means of rotation, the retaining ledge is pressed firmly against the disposable cutter by slight elastic deformation. As such, the same is firmly fixed and unable to shift. However, the cutter can only be clamped in a single, fixed position.

The German utility model DE 89 14 809 discloses a cutter head for the chip-removing machining of wood, plastic and the like, particularly for the longitudinal profiling of strips and plates, having a cylindrical base body with a plurality of paraxial grooves open to the circumferential surface. A cutter is clamped in each groove between a groove wall of the groove and a retaining ledge, wherein a toothing of the cutter spine engages positively with a corresponding toothing of the groove wall. The groove narrows in a wedge shape as it approaches the circumferential surface of the base body. A centrifugal wedge is arranged in this groove, firmly clamping the cutter, when the base body rotates, between the retaining ledge and the other groove wall.

US Patent Application No. 2002 0046632 discloses a tool body, having one or more tool holders into which blades can be inserted, the same held by a clamping mechanism. To keep the tool costs low, US 2002 0046632 suggests resharpening the blade and removing an equal amount of the blade base, thereby generating a new reference edge. The blade which is used has a channel at a distance from the blade base, wherein a protruding rib constructed in the tool holder engages with this channel when the blade is clamped in the holder. The channel is furnished on the flat side of the blade opposite the blade edge, and prevents the blade from sliding radially during operation. According to US 2002 0046632, the rib may alternatively be furnished on the mounting wedge to achieve the same purpose.

US Patent Application No. 2005 0265795 shows a blade head, having a tool holder in which a blade can be clamped by means of a mounting wedge. The blade has a chamfer on the blade base, opposite the flat side with the cutting edge, which provides the necessary clearance when the cutting edge is inserted into the tool holder opening.

When the cutting edge is changed or adjusted, the centrifugal wedge is first released using force which is directed radially inward—for example by a hammer blow. The retaining ledge, which is slightly elastically deformed towards the cutter when stressed, returns to its relaxed position. In this position, which is precisely determined by the stop edge between the two ledges, the seat of the cutter loosens sufficiently enough to be easily pulled out in the direction of the axis of the base body. Subsequently, optionally after sharpening, the cutter can be inserted once again in the axial direction—by way of example, in a position which is shifted outward by one tooth width. Once the cutter head is rotating at high speed, the centrifugal wedge tightens due to centrifugal force. The cutter is now firmly and precisely clamped. Since the centrifugal wedge is self-locking, it remains under load even after the cutter head is brought to a halt. An advantage of the cutter head described is that the screws do not need to be released when the cutter is changed. A disadvantage, however, is that the cutter can only be pulled out of the groove in the axial direction. This means that neighboring cutter heads must first be removed from the tool spindle before the cutter can be removed.

WO 2015 157871 discloses a cutter head for a woodworking machine, having a cylindrical, conical, or profiled base body which possesses two tool holders arranged in a uniform distribution over its circumference, for holding a cutting insert. The tool holders each comprise grooves which narrow radially, in each of which is clamped a cutting insert, between a first groove wall of the groove and a closure element. A first positive connection is provided between the cutting insert and the first groove wall. In addition, a centrifugal wedge is arranged between the closure element and a second groove wall opposite the first groove wall of the groove. The cutter head described is characterized in that a second positive connection is provided between the closure element and the centrifugal wedge. The advantage of this is that a radial insertion of a cutting insert is made possible.

A problem of the known cutter heads is that the neighboring cutter heads usually have to be dismounted for a cutter change if there is an axial angle.

The cutter head described in DE 35 05 974 comprises one or more cutting edges which have two rectangular recesses on the contact surface, wherein projections furnished on the contact surface engage without play in said recesses. The clamping block has, on the surface opposite the clamping surface, a spring which engages with a groove of the cutter head. Because of the spring/groove guidance, the clamping block can only move radially. In addition, there is a blind hole in the clamping block, and the end of a screw bolt engages with the blind hole. The screw bolt extends perpendicular to the axis of rotation of the cutter head. The cutter head also has a cutting edge which is not parallel to the axis of the cutter head.

In the embodiment disclosed by DE 35 05 974, it is not possible to change the angle of the cutting edge relative to the axis of rotation of the cutter head, while also using the same clamping block. This means that for each axial angle of the cutting edge, a specific clamping block is required. Furthermore, the cutter head can be equipped neither with a chip thickness limiter (chip breaker) nor with a support plate. The screw bolt exerts a force in its axis as a result of its pretensioning. This pretensioning force is transmitted in the axis of the screw bolt as a result of the straight support in the blind hole in the clamping block, and therefore exerts a lateral force on the cutting edge between the clamping block and the cutting edge due to the non-perpendicular clamping surface. A further disadvantage is that, due to this arrangement of the clamping block and screw, during operation—that is, in the presence of centrifugal force acting radially—an unfavorable clamping situation arises. This is because the clamping block turns out of position on the screw pin, around the pin, in the plane which is perpendicular to the axis of rotation.

DE 100 00 330 describes a cutter head, having one or more cutting edges which have a support plate on the rear side, when viewed in the direction of rotation of the cutter head, connected positively to the base body. This support plate can be wedge-shaped in order to modify the rake angle of the cutting edge. The screw end in this case is curved so as to compensate for rake angle changes. In this cutter head, the support plate has the function of modifying the rake angle of the cutting edge. For this purpose, either the support plate has a wedge shape, or a second wedge-shaped element is inserted between the support plate and the contact surface present in the base body. If a different rake angle will be set, an accordingly adapted pressure piece has to be used in each case. The positive radial fixation of the support plate, and therefore the cutting insert, is achieved by the support plate having a toothing on its rear, said toothing working together with a complementary toothing of the support surface of the cutter head base body recess. This type of radial securement of the cutting insert is cumbersome during manufacture.

Advantages of the Invention

It is therefore an advantage of the present invention to provide a cutter head for a machine tool for woodworking, wherein, when a tool or cutter is changed, it is no longer necessary to first unmount tool heads adjacent to the cutter head. Another advantage of the invention is to provide a cutter head in which the tool and/or the cutter can be inserted and removed in the radial direction. A further advantage is to suggest a cutter head in which the work effort for changing tools is minimized. A further advantage is that, when a cutter is changed, the new tool is precisely adjusted in the radial, and may also be in the axial, directions. A further advantage is to ensure a reliable radial fixation of the cutter head.

SUMMARY OF THE INVENTION

According to the invention, the aforementioned advantages are achieved by the features of the independent claims. Further advantageous implementations are defined in the dependent claims.

The invention relates to a cutter head, in particular a cutter head for a woodworking machine, having a cylindrical, conical, or profiled base body for the rotating and machining of a workpiece. The cutter head has at least two tool holders, may be arranged in a uniform distribution over the circumference thereof, for the purpose of holding a flat tool, in particular a cutting insert. The tool holders each have grooves, and in each of the same, one cutting insert can be clamped between a first groove wall and a clamping element, wherein the first groove wall forms an axial angle>0 degrees, or advantageously>5 degrees, relative to the axis of rotation of the cutter head.

One or more threaded holes which run perpendicular to the axial direction of the cutter head are included in the second groove wall of the groove, wherein a clamping screw, by means of which the clamping element can be biased in the direction of the first groove wall, can be held in each of the same. This has the advantage, in cutter heads wherein the cutting insert assumes an axial angle relative to the axis of rotation of the cutter head, that the cutting inserts can be changed without the need to unmount adjacent cutter heads.

According to the invention, the clamping element has a recess, on the side which faces away from the cutting insert, with which the clamping screw can engage via its front end. The clamping screw is guided in the recess, and the same clamping element can be used for various axial angles.

The recess expediently narrows radially inwards, and/or from the top to the inside. The depth of the recess may decrease radially inward. This has the advantage that, as centrifugal force increases, the clamping element wedges between the front end of the screw and the cutting insert, exerting even more clamping force on the cutting insert, thus enabling an even better clamping of the cutting insert. For this reason, the recess has a runout oriented inward. The recess is wedge-shaped, and the depth of the wedge-shaped recess decreases continuously in the radial direction. In a radial cross-section, the recess has the shape of a wedge and/or a ramp with a depth which drops continuously toward the cutter head axis of rotation.

According to one embodiment, the recess in the clamping element is designed as a ball socket, and the front end of the clamping screw is designed as a round head. This has the advantage that, regardless of the axial angle, a surface contact is realized between the round head and the ball socket in each case. Consequently, one and the same clamping element can be used for cutter heads with different axial angles.

A projection which serves as a radial stop for the cutting insert may be included in the first groove wall of the tool holder, running substantially parallel to the groove base, and the cutting insert has a positioning groove on the rear side thereof with which the projection can engage. This ensures a precise positioning of the cutting insert in the tool holder.

The projection is advantageously formed by a fitted key which is held in a groove included in the first groove wall. Such a construction can be realized cost-effectively from a manufacturing point of view. This also offers the advantage that the fitted key can be replaced should it ever be worn down.

In another embodiment of the invention, there is a spring element which is arranged in the groove in such a manner that it presses the cutting insert radially outward when the tool is clamped, thereby holding it against the projection. This enables a precise positioning of the cutting insert in the tool holder. In addition, the clamping force can be lower than in conventional cutter heads, where the cutting inserts must be secured against the great centrifugal forces exerted during operation.

Advantageously, the spring element is furnished or constructed on the clamping element. This is a simple and inexpensive construction. The spring element can be a leaf spring, by way of example, and may be made of spring steel, arranged on the underside of the clamping element and projecting from the front side of the clamping element—specifically far enough that the front end of the leaf spring can engage underneath the cutting insert.

According to another embodiment, the spring element can be arranged in the cutter head body, for example in a slot or a bore included underneath the cutting insert seat. According to an advantageous embodiment, the spring element is a spring which is received in a bore in the cutter head body. The same extends beyond the shoulder on which the cutting insert is arranged by a small distance, such that the cutting insert rests, via its lower edge, on the spring during insertion into the tool holder.

According to another independent aspect of the invention, the clamping element is constructed in two pieces, and has a clamping body and a chip breaker plate. This has the great advantage that the chip breaker plate, which is exposed to greater wear than the clamping body itself, can be replaced independently of the clamping body.

A positive and/or non-positive connection is advantageously provided between the chip breaker plate and the clamping body. As such, the two components can be held together as if they were one piece.

The positive connection between the clamping body and the chip breaker plate may be realized by elevations and depressions which are furnished on the sides of the clamping body and the chip breaker plate which rest against each other. In this case, it is advantageous from the perspective of manufacturing technique that the elevations are constructed on the front of the clamping body and the depressions are constructed on the chip breaker plate.

The non-positive connection is advantageously realized by one or more magnets which are embedded in the front of the clamping element. This makes it possible to fix the chip breaker plate on the clamping body in a manner allowing detachment.

As a general rule, another support plate can also be included in the cutter head, and can be arranged between the cutting insert and the first groove wall. The provision of a support plate has the advantage that a certain cutter head can be equipped with other cutting inserts, having any other profiling. The front side of the support plate is designed in such a manner that it can work together positively with a cutting insert. To secure the support plate against the centrifugal forces exerted during operation, a positive connection is made between the first groove wall and the rear side of the support plate. This positive connection can be formed by a projection on the rear side of the support plate, which can work together with a groove in the first groove wall.

Advantageously, the first groove wall of the groove may form an angle between 0 and 40 degrees, between 15 and 35 degrees, or advantageously between 20 and 30 degrees, with a radial line extending from the center of the cutter head.

A centering pin can be embedded (e.g. with a press fit) in the first groove wall, to laterally center the cutting insert, and optionally the support element.

An advantageous aspect of the present invention is also a cutter head for a woodworking machine, having a cylindrical or conical, or profiled, base body which comprises at least two tool holders, may be arranged in a uniform distribution over the circumference thereof, for the purpose of holding a cutting insert, wherein a single tool holder is formed by a groove open in the radial direction. The groove is formed by a first groove wall and a second groove wall which is spaced opposite the first groove wall, and a groove base. The cutter head according to the invention is further characterized in that the clamping element is designed as two pieces and comprises a clamping body and a chip breaker plate. This has the advantage that it is not necessary to replace the entire clamping element at the same time if the chip breaker is worn.

Further advantageous embodiments of the cutter head with a two-piece clamping element have already been discussed above.

A further advantageous aspect of the present invention relates to a system having a cutter head according to the invention and a cutting insert, characterized in that the cutting insert has, on the rear side thereof, at a short distance from the cutting insert lower edge, a positioning groove running in the axial direction, and a functional surface on the cutting insert lower edge. This system has the advantage that it allows a precise radial positioning of the cutting insert.

The functional surface is advantageously formed by a chamfer which interrupts the rear side edge of the cutting insert. This is a simple construction which enables the cutting insert to rest against the projection when being clamped. Further advantageous embodiments will be apparent from the description.

BRIEF DESCRIPTION OF THE DRAWINGS

Embodiments of the invention will now be described in further detail with reference to the following figures, wherein:

FIGS. 18 and 19: show a first embodiment of a profiled cutting insert, which has a centering recess, in rear side and side views;

FIGS. 20 and 21: show a second embodiment of a profiled cutting insert, without a centering recess, in rear side and side views;

FIGS. 22 and 23: show a third embodiment of a profiled cutting insert, which has a V-shaped centering groove, in rear side and side views; and FIG. 24: shows a side view of a fourth embodiment of a profiled cutting insert, which has a rounded centering groove.

DETAILED DESCRIPTION OF THE ILLUSTRATED EMBODIMENTS OF THE INVENTION

Figure 1:
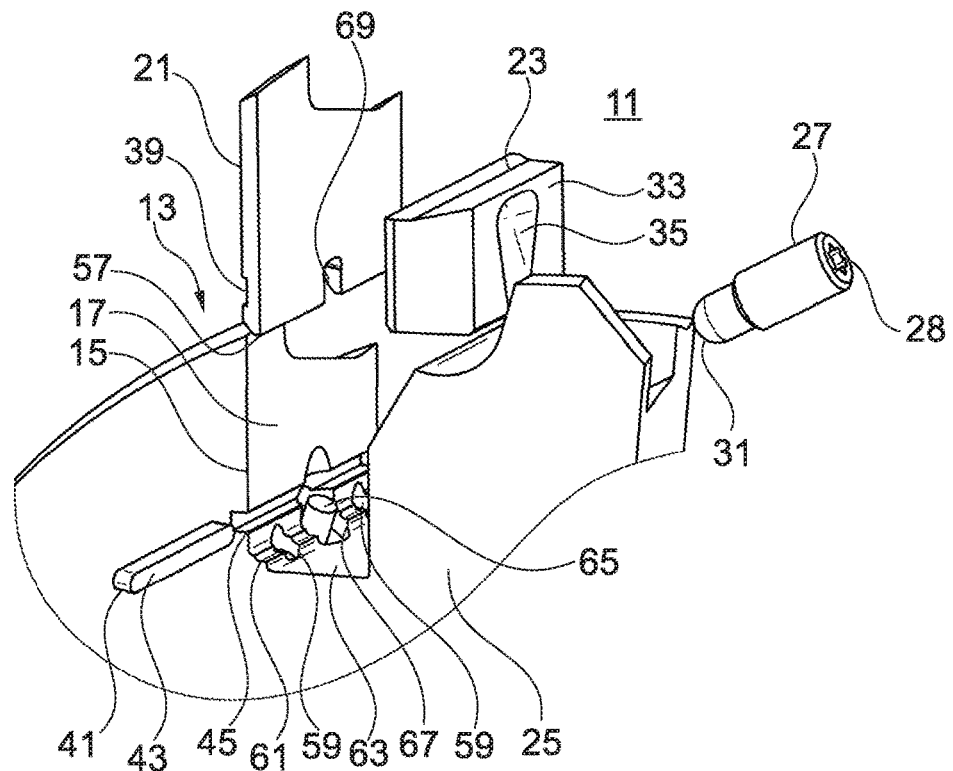
FIG. 1: shows a perspective, exploded-style partial view of a first embodiment of a cutter head according to the invention, having a cutting insert, a clamping element, and a clamping screw.
Figure 2:
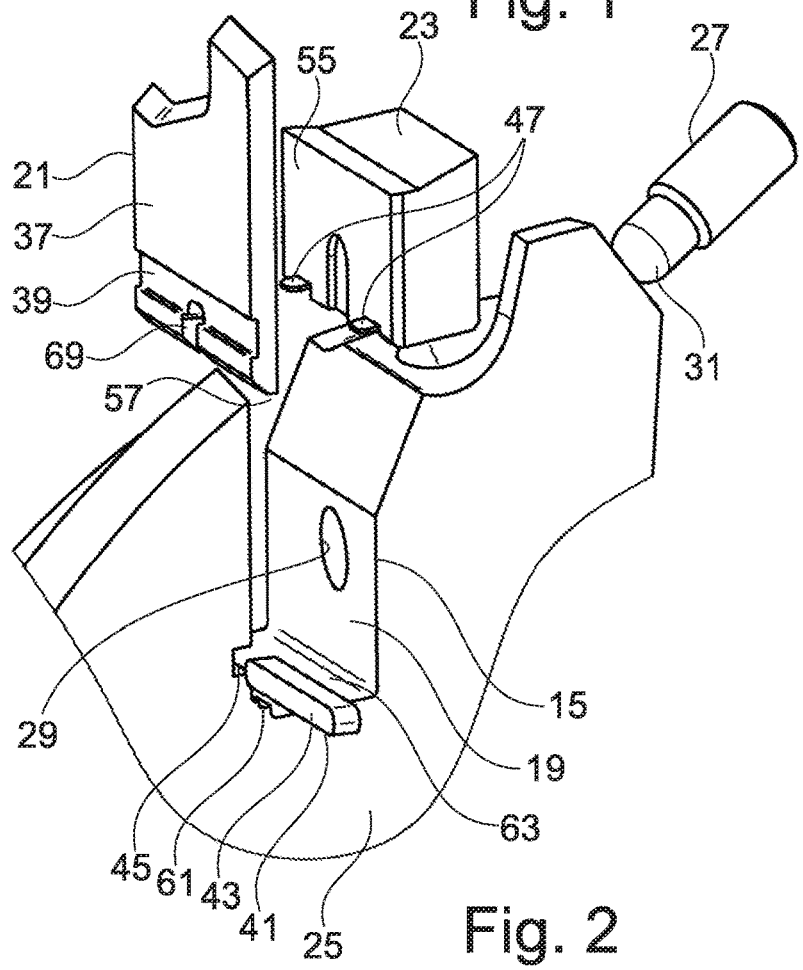
FIG. 2: shows a view as in FIG. 1, but from the rear side.

FIGS. 1 and 2 show a first embodiment of a cutter head 11 according to the invention, for the machining of materials such as wood, plastic, light metal, composite materials, and the like. The cutter head 11 has several, typically two, tool holders 13 distributed over the circumference thereof—only one of which is shown. The tool holder 13 consists of a groove 15, the first and second groove walls 17, 19 of which extend at an angle to the axis of rotation of the cutter head 11. A tool in the form of a cutting insert 21 can be held in each of the tool holders 13. A clamping body 23 which can be pressed against the first groove wall 17 by means of a clamping screw 27 which can be screwed into the cutter head body 25, with engaging means 28 (in the present case, Torx® engaging means), is used to clamp the cutting insert 21. For this purpose, a threaded bore 29 is included in the cutter head body 25, and the clamping screw 27 can be screwed into the same.

The special feature of this cutter head 11 is that the threaded bore 29, and thus the clamping screw 27, do not meet the clamping body 23 at a right angle, as is common practice in conventional cutter heads, but rather at an angle≠90 degrees. In order to enable such clamping, the front end of the clamping screw 27 is designed as a round head 31. The clamping body 23, in turn, possesses, on its rear side 33 which faces the threaded bore 29, a recess 35 with which the clamping screw 27 can engage during the clamping of the cutting insert 21. The recess 35 may be designed as a ball socket which can hold the round head 31 of the clamping screw 27. This ensures that the pressure point, and thus the direction of power transmission, is always at the same point.

A further special feature of the cutter head 11 is that the cutting insert 21 abuts radially outward. For this purpose, the cutting insert 21 has, on the rear side 37 thereof, a positioning groove 39 which runs in the axial direction, which can work together with a projection 41 furnished on the first groove wall 17. From the perspective of manufacturing technique, the projection is realized by a fitted key 43 which is held in a first groove 45 included in the groove wall 17.

Strictly speaking, the above definition concerning the axial direction only applies when the axial angle is zero. For the sake of simplification of the description, however, in the context of the present invention and in the event an axial angle is used, the term "axial direction" should also include the projection of a parallel line relative to the axial direction.

Figure 10:
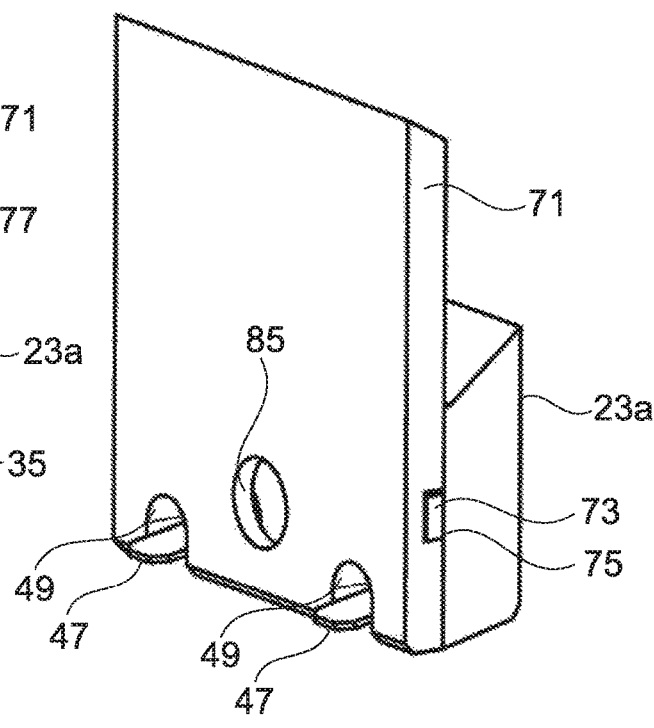
FIG. 10: shows a perspective view of the clamping element of FIG. 9, from the rear side.
Figure 11:
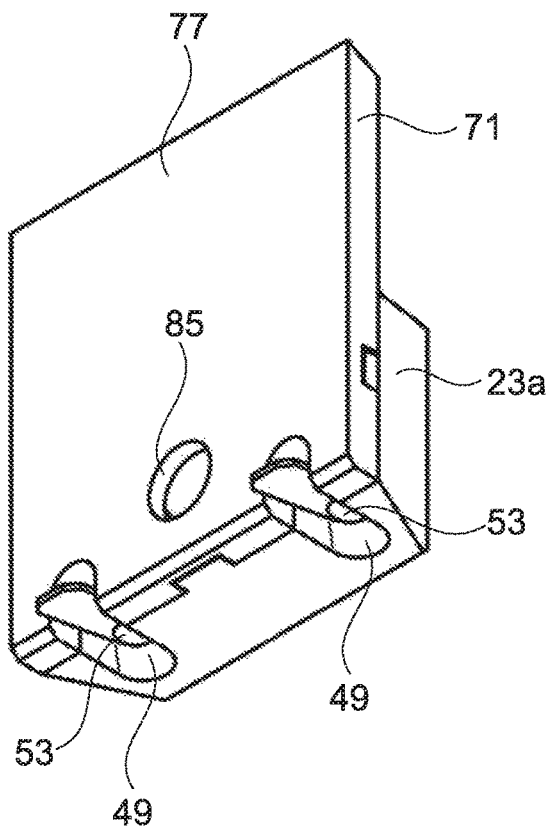
FIG. 11: shows a frontal perspective view of the clamping element of FIG. 9, at an angle from below.
Figure 12:
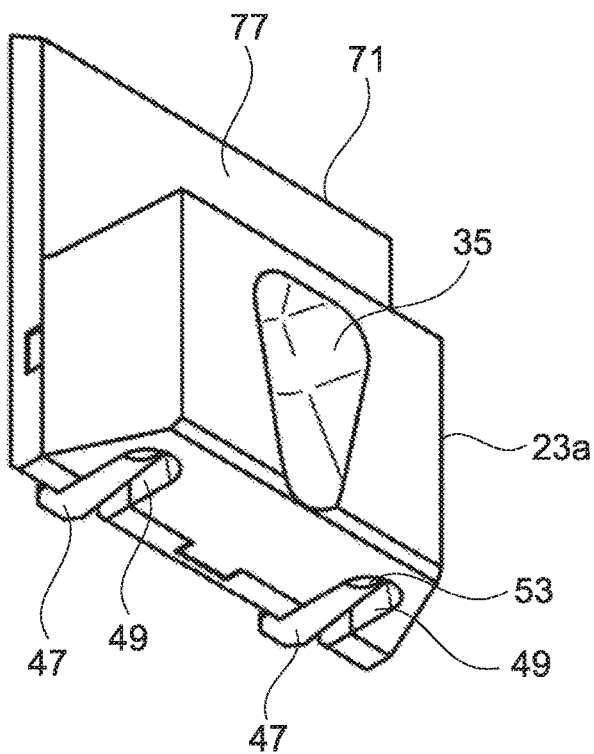
FIG. 12: shows a rear side perspective view of the clamping element of FIG. 9, at an angle from below.

So that the cutting insert 21 automatically abuts radially outwards against the fitted key 43 during the clamping, two leaf springs 47 are included on the clamping body 23. The two leaf springs 47 are each fixed in a recess 49 on the underside 51 of the clamping body by means of soldering, for example, or by another fastening means (see FIGS. 10 to 12). According to the embodiment shown, a rivet 53 is used, and is inserted into a bore (not shown) in the clamping element 23.

As can be seen in FIG. 2, the leaf springs 47 protrude from the front side 55 by a certain distance, such that they can engage during the clamping via the front end thereof under the lower edge 57 of the cutting insert 21, and the cutting insert 21 can therefore press radially outward via the functional surface 94. In order to allow free movement for the leaf spring 47, recesses 59 are also provided in the first groove wall 17, and the leaf springs can project into the same.

A shoulder 61, which is provided at the groove base 63 and protrudes from the first groove wall 17, serves as a lower stop for the cutting insert 21. The front ends of the leaf springs 47 are positioned, when the clamping element 23 is inserted, below the shoulder 61, such that the cutting insert 21 initially rests on the same during the insertion. Only during the tightening of the screw 27 is the cutting insert 21 pressed radially outward against the shoulder 61 and at the same time against the first groove wall 17, due to the guided movement of the clamping element 23 and thus also the leaf springs 47 on a functional surface 94 formed on the lower edge of the cutting insert, in the direction of the first groove wall 17 (also see the description for FIGS. 17 to 22 below).

The centrifugal forces of the cutting insert 21 resulting from the operation are thus received by the projection 41, since a purely non-positive connection exists between the cutting insert 21 and the chip breaker plate 71. As such, the screw 27 is loaded to a much lesser degree, and only accepts a fraction of the centrifugal force produced by the clamping element 23; 23a, and optionally the chip breaker plate 71.

A positioning pin 65, inserted into a bore 67 and protruding at an angle from the groove base 63, is included on the groove base 63 to laterally position the cutting insert 21. The positioning pin 65 in this case engages with a recess 69 included in the lower edge 57, which need not necessarily be arranged centrally. As shown in the further embodiment variants of the cutting insert 21, it can also be laterally positioned on one of the outer flanks, without a recess 69.

Figure 3:
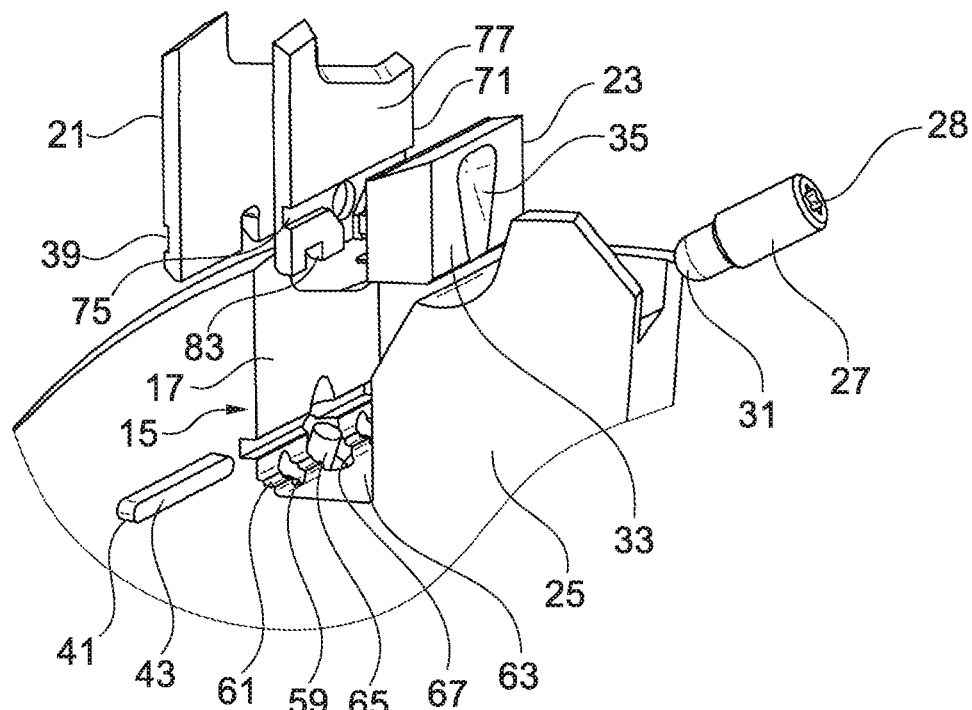
FIG. 3: shows a perspective, exploded-style partial view of a second embodiment of a cutter head according to the invention, which, compared to the first embodiment, is equipped with a further chip breaker.
Figure 4:
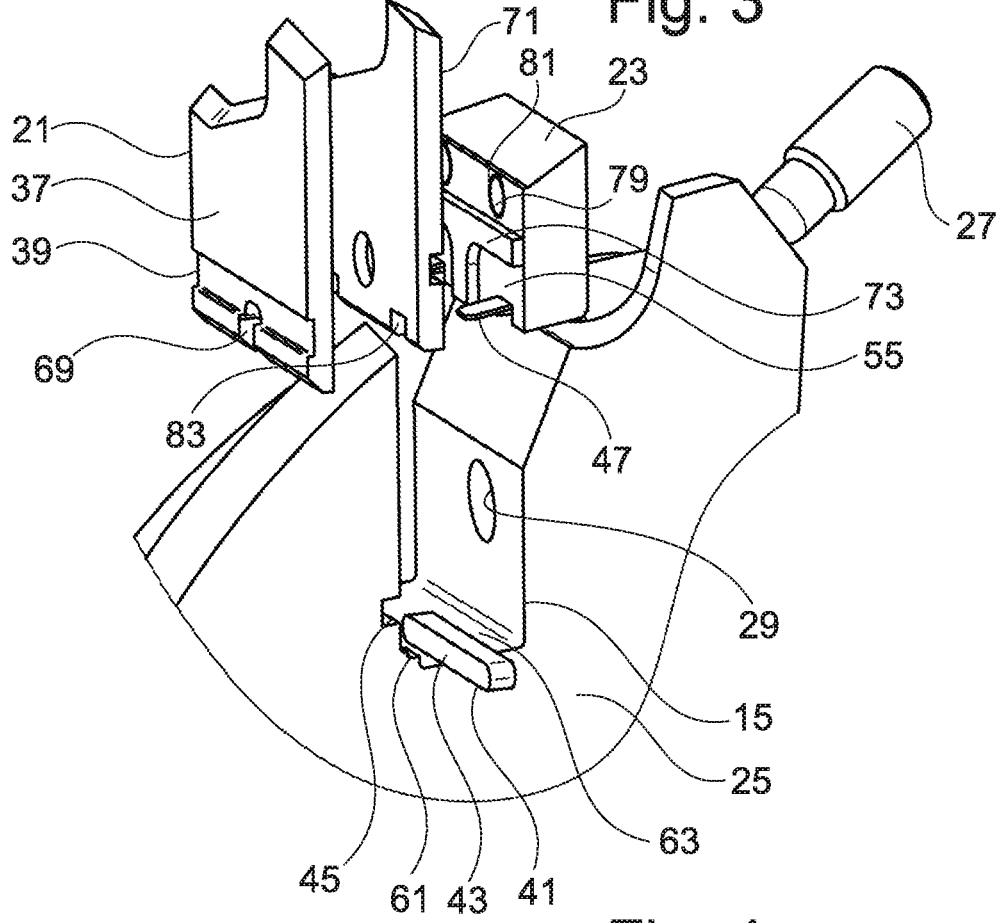
FIG. 4: shows a view as in FIG. 3, but from the rear side.

The embodiment according to FIGS. 3 and 4 differs from the first in that a chip breaker plate is included 71. The special feature in this case is that the clamping body 23a and chip breaker plate 71 are designed as two pieces, and can be connected to each another in a positive and/or non-positive manner. According to the embodiment shown, the clamping body 23a has, on the front side 55 of the clamping body 23a, an elevation 73 with a T-shaped contour, which can work together positively with a corresponding depression 75 formed in the rear side 77 of the chip breaker plate 71. So that the chip breaker plate 71 is held non-positively on the clamping body 23a, two magnets 79 are embedded in blind holes 81 in the front side 55 of the clamping body 23a. Two recesses 83 for the passage of the leaf springs 47 are included on the lower edge of the chip breaker plate. In addition, a round hole 85 is also included in the middle of the chip breaker plate 71, intended to provide space for the head of the positioning pin 65 protruding from the groove base 63.

In order to allow great modularity, the clamping body 23a and the chip breaker plate 71 together have the same thickness as the clamping body 23 of the first embodiment. As such, depending on the application and material, work can be performed with and without the chip breaker plate. In addition, the chip breaker plate, which is exposed to wear, can be replaced separately without the need to also replace the whole clamping element at the same time. This can save cost.

Figure 5:
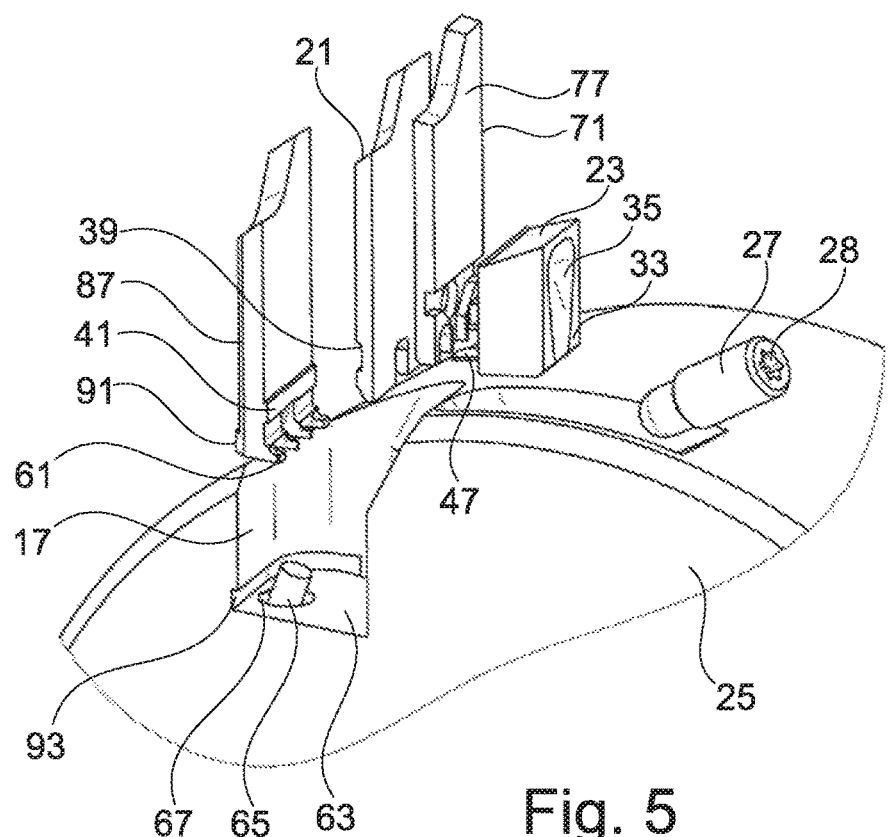
FIG. 5: shows a perspective, exploded-style partial view of a third embodiment of a cutter head according to the invention, which, compared to the second embodiment, is equipped with a further chip breaker.
Figure 6:
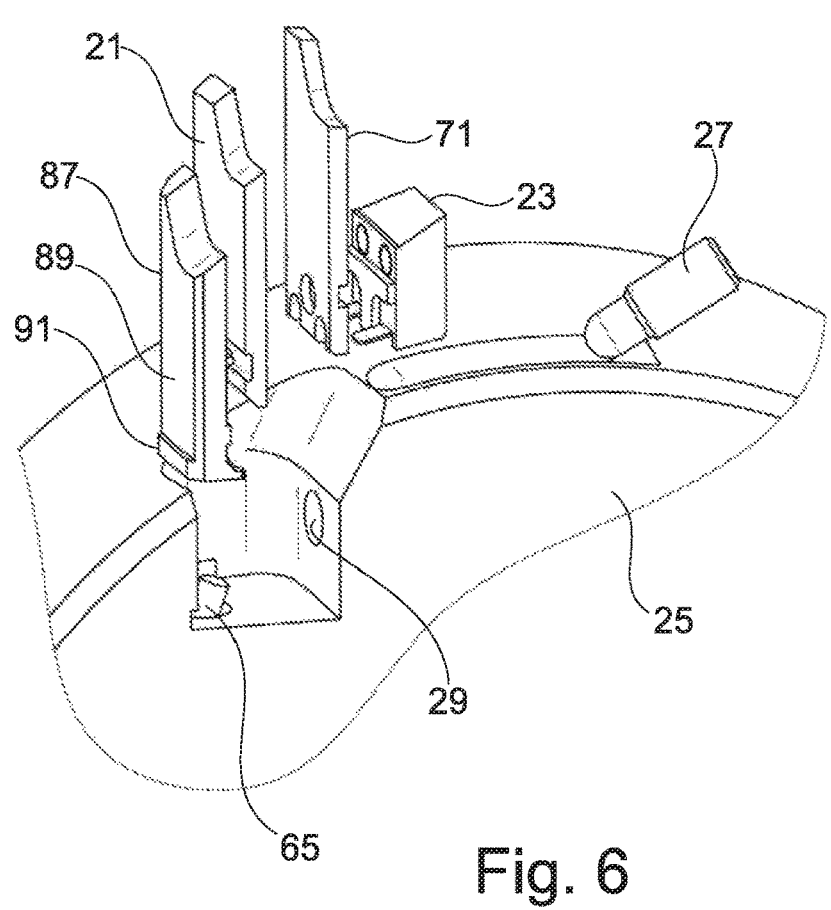
FIG. 6: shows a view as in FIG. 5, but from the rear side.

The embodiment according to FIGS. 5 and 6 differs from the first in that a support plate 87 is included in addition to a chip breaker plate 71. The support plate 87 can be used when, using one cutter head 11, work will be carried out with a completely differently profiled cutter. The support plate 87 has, on the rear side 89, a foot 91 protruding rearward, which fits into a corresponding groove 93 in the first groove wall 17. As such, the support plate 87 is held positively in the tool holder 13 against the centrifugal forces exerted during operation. The front side 95 of the support plate 87 is designed analogously to the first groove wall 17 of the first two embodiments. That is, there is a projection 41 which can work together positively with the positioning groove 39 of the cutting insert 21, as well as a shoulder 61 as a support for the cutting insert 21. The shoulder 61 has interruptions in order to provide space both for the positioning pin 61 and for the leaf springs 47.

Figure 7:
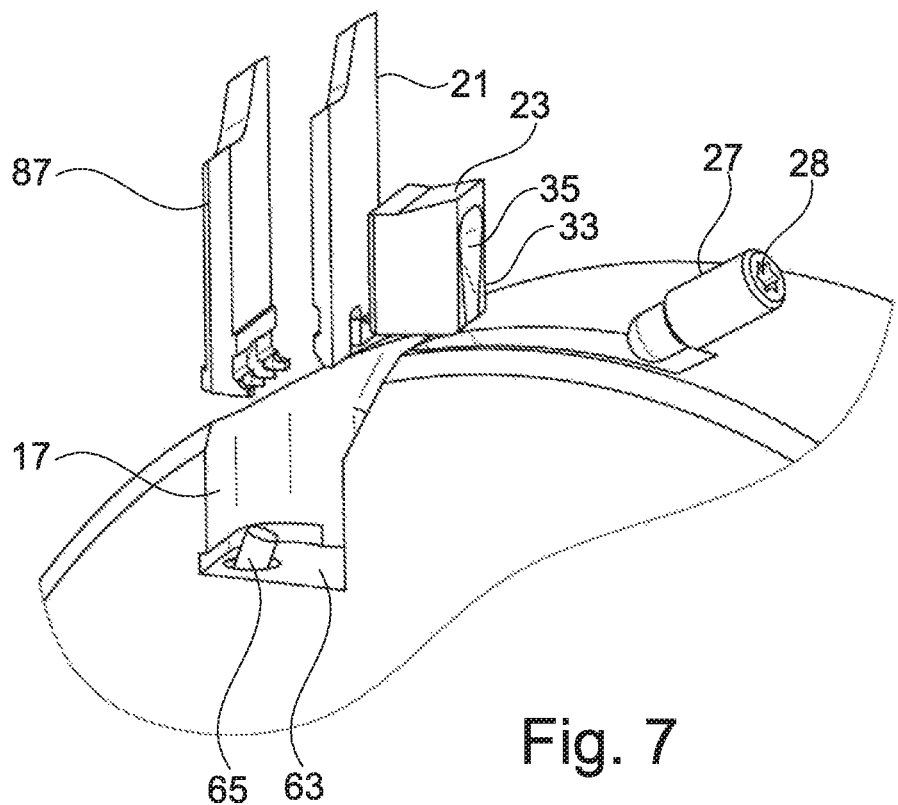
FIG. 7: shows a perspective, exploded-style partial view of a fourth embodiment of a cutter head according to the invention, which, compared to the previous embodiments, is equipped only with one support plate and one chip breaker.
Figure 8:
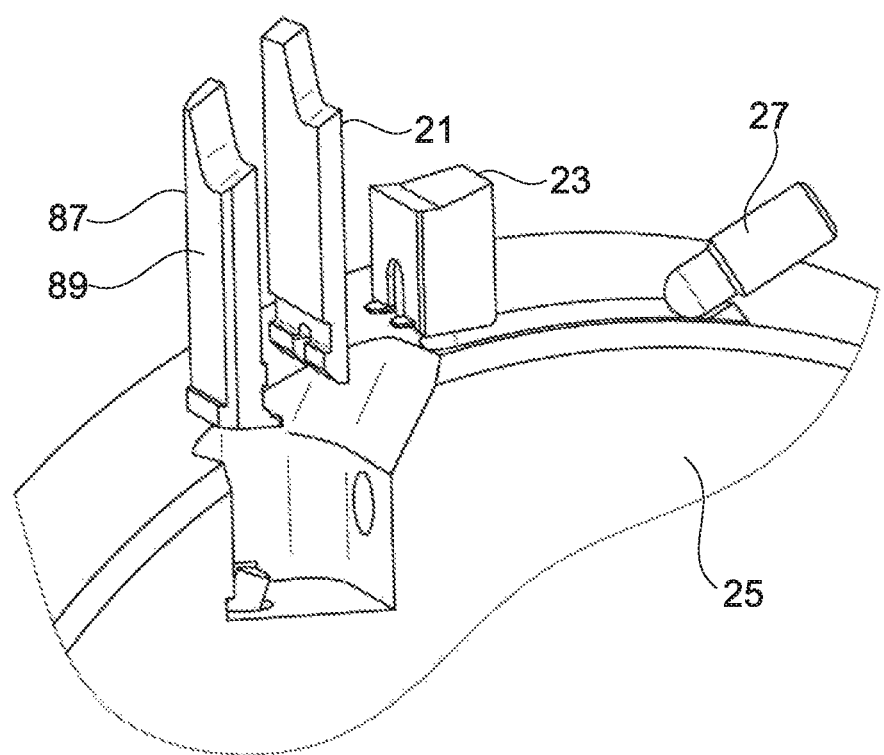
FIG. 8: shows a view as in FIG. 7, but from the rear side.
Figure 9:
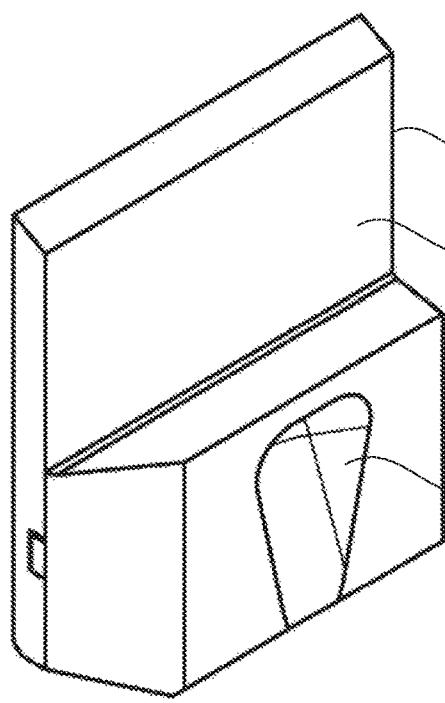
FIG. 9: shows a perspective view of a two-piece clamping element, with a clamping body and a chip breaker plate.

The embodiment according to FIGS. 7 and 8 differs from the previous embodiment by the fact that a support plate 87 and a cutting insert 21 are included, although no chip breaker plate is.

FIGS. 9 to 12 show a two-piece clamping element as has been described above in the context of the description of the second embodiment. Firstly, in that a chip breaker plate is included 71. The special feature of the two-piece clamping element is that the clamping element 23a and the chip breaker plate 71 are positively and non-positively connected to each other.

Figure 13:
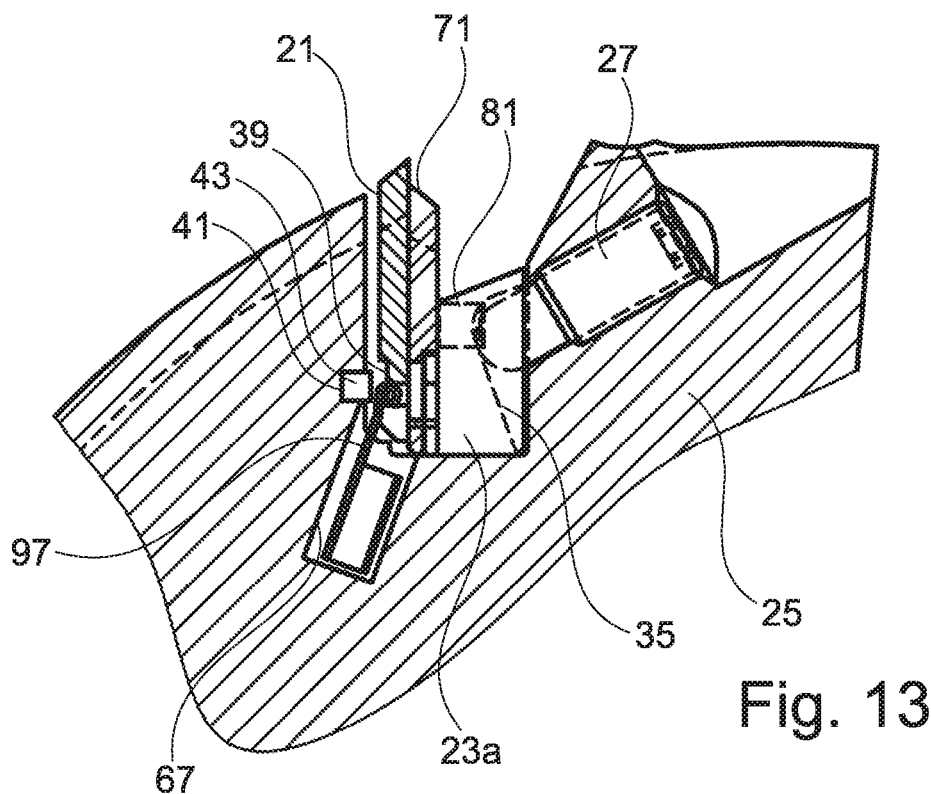
FIG. 13: shows a partial view of a longitudinal central section of a cutter head according to the invention, with a first embodiment of a combined positioning- and spring element.
Figure 14:
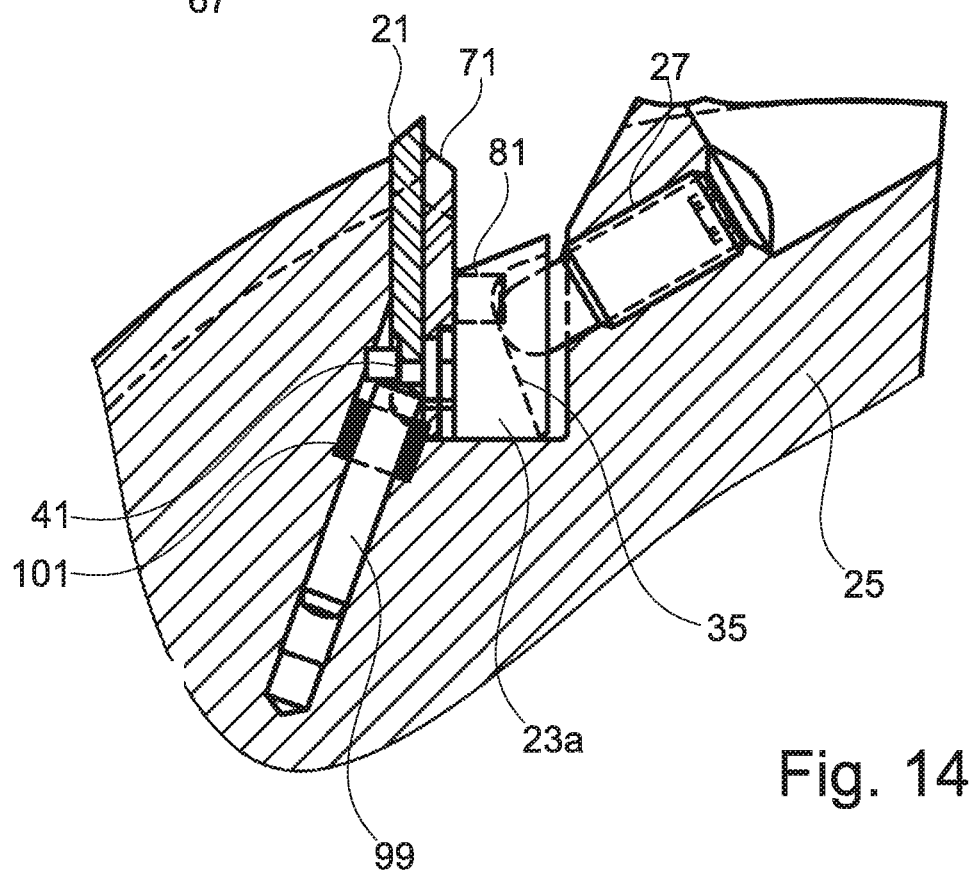
FIG. 14 shows a second embodiment of a combined positioning- and spring element, likewise in a longitudinal central section.

FIGS. 13 and 14 show further variants of how the cutting insert 21 can be positioned radially outwards against a stop surface. In contrast to the embodiment described so far, in which the spring element is arranged on the clamping body 23, in the other variants, instead of a pure positioning pin, a combined positioning- and spring element is inserted into the bore 67. According to the embodiment of FIG. 13, a leaf spring 97 is included which both laterally positions the cutting insert and presses the same radially outward, such that the lower groove wall of the positioning groove 39 of the cutting insert 21 forms a stop surface with the underside of the projection 41.

According to the embodiment of FIG. 14, a pin 99 is inserted into the bore 67, and is equipped at the top with a rubber attachment 101. The rubber attachment 101 in this case is the resilient element which presses the cutting insert radially outwards.

Figure 15:
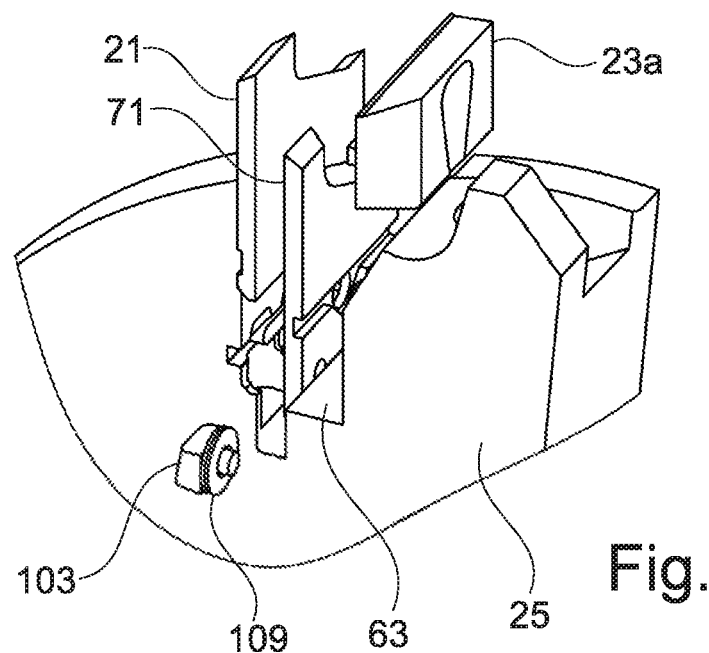
FIG. 15: shows a third embodiment of a combined positioning- and spring element in an exploded view.
Figure 16:
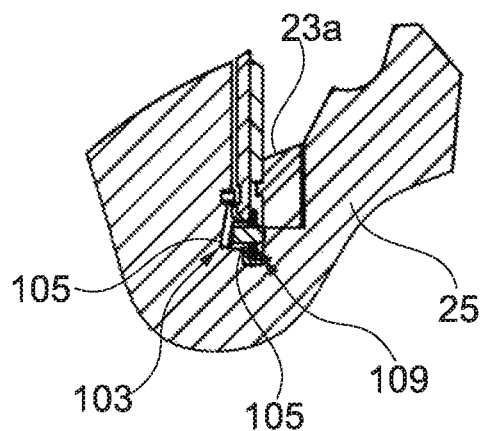
FIG. 16: shows the embodiment of FIG. 15, with the clamping element detached.
Figure 17:
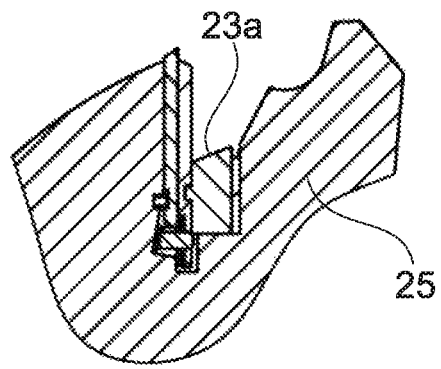
FIG. 17: shows the embodiment of FIG. 15, with the clamping element in the operating position—that is, with the cutting insert clamped.

FIGS. 15 to 17 show a further embodiment in which a conical positioning element 103 is held in a cavity 105 groove base 63. The positioning element 103 has a support element 107 and a rubber element 109 arranged thereon. If the clamping element 23 is pressed against the cutting insert 21, the positioning element is pushed against the first groove wall 17 and presses the cutting insert radially outwards until the lower groove wall of the groove 30 rests against the lower edge of the projection 41. So as to not overload the cutting insert 21 by the pressure of the positioning element, a rubber element is installed between the positioning element 103 and the chip breaker plate 71, which can compensate for any additional relative displacement between the positioning element 103 and the chip breaker plate 71.

FIGS. 18 to 24 illustrate different embodiments of cutting inserts 21 which can be used with the cutter head according to the invention. The cutting inserts 21 are designed as a rule as profiled cutters with a profile 111. As already described above, the cutting insert 21 can have a U-shaped recess 69 in the center, which serves the purpose of centering (FIGS. 18 and 19). When the cutting insert 21 is inserted into the groove 15, the head of the positioning pin 65 engages with the U-shaped recess 69 of the cutting insert 21, such that it is laterally positioned in the tool holder.

The cutting inserts 21 shown have a cutting edge 115 on the chip side 113. On the edge diagonally opposite the cutting edge 115, the functional surface 94 is formed in the shape of a chamfer on the cutting insert base. Via this functional surface 94, the cutting insert 21 is bumped radially outward by one, or by the multiple, spring elements 47; 97; 101; 109 upon clamping, until the lower edge of the positioning groove rests against the projection 41.

As can also be seen in FIGS. 18 to 23, the positioning grooves 39 can have different designs. They can have a U-shaped (FIGS. 19 and 21), V-shaped (FIG. 23) or rounded (FIG. 24) cross-section.

A cutter change takes place as follows in the cutter head according to the invention: First, the clamping screw 27 is loosened with a screwdriver two turns, such that the clamp element 23 and/or the clamp element 23a with the chip breaker and the cutting insert 21 is pulled back in the groove 15 by a short distance in the direction of the second groove wall 19 (see FIG. 13). A gap 17 is opened between the chip breaker and the first groove wall 17, and the cutting insert 21 can be removed.

The insertion of a new cutting insert occurs in the reverse order. In this case, the cutting insert 21 is inserted into the tool holder 13 and pressed against the chip breaker, or—if the same is not included in the configuration—is pressed against the clamping element 23. When the clamping screw 27 is tightened, the cutting insert 21 is lifted by the spring element—for example, spring element 97—and the positioning groove 39 comes to rest against the projection 41. This means that the radial positioning takes place automatically.

The cutter head according to the invention particularly serves the purpose of machining wood, plastic, cork, bone, plastic, light metal alloys, wood materials such as chipboard, fiberboard, plywood, etc. Tools which can be used are cutting inserts with a straight, contoured or profiled cutting edge. The cutting inserts consist of flat cutting edges of a thickness between about 1 mm and 3 mm. The cutter head is arranged during operation on a spindle of a woodworking machine in a torque-proof manner, wherein further cutter heads can be to attached to the spindle directly adjacent thereto. The loosening and tightening of the clamping element is performed at a right angle to the axis of rotation of the cutter head. This has the advantage that the neighboring tools do not have to be unmounted for a cutter change.

The invention relates to a cutter head 11 for a woodworking machine, having a cylindrical, conical, or profiled base body which comprises at least two tool holders 13 for the purpose of holding a cutting insert 21, which may be arranged in a uniform distribution over the circumference thereof. The tool holders 13 each comprise a groove 15 which is open in the radial direction, in which a cutting insert 21 is clamped between a first groove wall 17 and a one- or two-piece clamping element 23; 23a, 71. As an additional variant, the cutter head 11 according to the invention can be designed with a support plate 87 which can be arranged between the cutting insert 21 and the first groove wall 17. The clamping screws 27 are always arranged at right angles to the axis, even when axial angle is used, and are thus always accessible for a cutter change. So that the pressure point, and thereby the direction of power transmission, is always at the same point, the screw holder on the clamping element 23, 23a may be designed as a ball socket 35, and the front end of the screw 27 is designed as a round head 31. The cutter head according to the invention also has a spring element 47, 97, 101, 109, which automatically positions the cutting insert 21 during the clamping process, and presses the same via the functional surface 94 radially outward against a stop 41 furnished for this purpose.

In the above description, the embodiments are each described with reference to a cutter head which is circular-cylindrical in cross-section, in which the tool is held in an axial (axially parallel to the axis of rotation) groove. However, in the context of the invention, the tool holder and/or groove can also run at an angle to the axis of rotation (for example, a cone-shaped cutter head). The groove can therefore form 3 spatial angles relative to the axis of rotation, and thereby define a rake angle, an offset angle, and an axial angle.

The invention claimed is:

1. A cutter head, particularly for a woodworking machine, comprising:
   at least two grooves defined by the cutter head, each of the at least two grooves configured to receive a cutting insert, the cutting insert being clampable between a first groove wall of the groove and a clamping element, the first groove wall forming an axial angle greater than 0 degrees relative to an axis of rotation of the cutter head, a second groove wall of each of the at least two grooves defining one or more threaded holes that extend perpendicular to the axis of rotation of the cutter head;
   one or more clamping screws held in the one or more threaded holes, the one or more clamping screws configured to pretension the clamping element in a direction of the first groove wall; and
   a spring element arranged in each of the at least two grooves in such a manner that it presses the cutting insert radially outward with guidance during clamping;
   wherein the clamping body defines a recess on a side that faces away from the cutting insert, wherein the one or more clamping screws comprise a round head to be guided within the recess, and wherein the recess in the clamping body comprises a ball socket.

2. The cutter head of claim 1, wherein the at least two grooves are arranged in a uniform distribution over a circumference of the cutter head.

3. The cutter head of claim 1, wherein a depth of the recess decreases radially inward such that the clamping body exerts an additional clamping force in the direction of the cutting insert when centrifugal force arises during operation of the cutter head.

4. The cutter head of claim 1, wherein a projection that extends substantially parallel to a groove base is included in the first groove wall of each of the at least two grooves and serves as a radial stop for the cutting insert, and wherein the cutting insert has a positioning groove on a rear side with which the projection can engage.

5. The cutter head of claim 4, wherein the projection is formed by a fitted key that is held in a wall groove in the first groove wall.

6. The cutter head of claim 1, wherein the clamping body includes the spring element.

7. The cutter head of claim 1, wherein the spring element is a leaf spring arranged on an underside of the clamping body and protrudes from the clamping body.

8. The cutter head of claim 1, wherein the spring element is positioned in a body of the cutter head.

9. The cutter head of claim 8, wherein the spring element is positioned in a bore in the body of the cutter head.

10. The cutter head of claim 1, wherein the clamping body is formed in two pieces and comprises a clamping body and a chip breaker plate.

11. The cutter head of claim 10, wherein at least one of a positive or non-positive connection is provided between the chip breaker plate and the clamping body.

12. The cutter head of claim 11, wherein the positive connection between the clamping body and the chip breaker plate comprises elevations and depressions on respective sides of the clamping body and the chip breaker plate that rest against each other.

13. The cutter head of claim 11, wherein the non-positive connection comprises one or more magnets that are embedded in a front side of the clamping body.

14. The cutter head of claim 1, further comprising a support plate arranged between the cutting insert and the first groove wall.

15. The cutter head of claim 14, wherein the support plate has a foot on a rear side thereof that can work together with an undercut in the first groove wall, and has a projection on the front side thereof, that can work together with the positioning groove of the cutting insert.

16. The cutter head of claim 1, wherein the first groove wall of each of the at least two grooves forms an angle between 0 and 40 degrees with a radial line extending from a center of the cutter head.

17. The cutter head of claim 1, further comprising a positioning pin embedded in the first groove wall to laterally center at least one of the cutting insert or the support plate.

18. A cutter head, particularly for a woodworking machine, comprising:
   at least two grooves defined by the cutter head, each of the at least two grooves configured to receive a cutting insert, the cutting insert being clampable between a first groove wall of the groove and a clamping element, the first groove wall forming an axial angle greater than 0 degrees relative to an axis of rotation of the cutter head, a second groove wall of each of the at least two grooves defining one or more threaded holes that extend perpendicular to the axis of rotation of the cutter head;
   one or more clamping screws held in the one or more threaded holes, the one or more clamping screws configured to pretension the clamping element in a direction of the first groove wall; and
   a support plate arranged between the cutting insert and the first groove wall, the support plate having a foot on a rear side thereof configured to work together with an undercut in the first groove wall, the support plate having a projection on a front side thereof configured to work together with the positioning groove of the cutting insert;
   wherein the clamping body defines a recess on a side that faces away from the cutting insert, wherein the one or more clamping screws comprise a round head to be guided within the recess, and wherein the recess in the clamping body comprises a ball socket.

19. The cutter head of claim 18, wherein a depth of the recess decreases radially inward such that the clamping body exerts an additional clamping force in the direction of the cutting insert when centrifugal force arises during operation of the cutter head.

20. The cutter head of claim 18, wherein a projection that extends substantially parallel to a groove base is included in the first groove wall of each of the at least two grooves and serves as a radial stop for the cutting insert, and wherein the cutting insert has a positioning groove on a rear side with which the projection can engage.

21. The cutter head of claim 18, further comprising a spring element arranged in each of the at least two grooves in such a manner that it presses the cutting insert radially outward with guidance during clamping.

* * * * *